United States Patent [19]

Turner

[11] 4,193,224
[45] Mar. 18, 1980

[54] STEM GROWTH CONTROL DEVICE AND METHOD

[76] Inventor: Henry H. Turner, 2702 Techwood Dr., Columbus, Ga. 31906

[21] Appl. No.: 1,188

[22] Filed: Jan. 5, 1979

Related U.S. Application Data

[63] Continuation of Ser. No. 745,324, Nov. 26, 1976, abandoned, which is a continuation of Ser. No. 610,771, Sep. 5, 1975, abandoned, which is a continuation-in-part of Ser. No. 429,392, Dec. 28, 1973, abandoned.

[51] Int. Cl.² ............................................. A01G 1/00
[52] U.S. Cl. ........................................ 47/58; 47/1 R
[58] Field of Search ........................................ 47/58, 1

[56] References Cited

U.S. PATENT DOCUMENTS

| | | | |
|---|---|---|---|
| 436,626 | 9/1890 | Dixon | 85/11 X |
| 939,796 | 11/1909 | Buffat | 85/15 |
| 2,005,484 | 6/1935 | Thorin | 85/15 X |
| 2,353,579 | 7/1944 | Miller | 85/11 |

FOREIGN PATENT DOCUMENTS

| | | | |
|---|---|---|---|
| 173100 | 4/1952 | Austria | 85/15 |
| 496459 | 10/1950 | Belgium | 85/15 |
| 589101 | 12/1933 | Fed. Rep. of Germany | 85/15 |

*Primary Examiner*—Robert E. Bagwill
*Attorney, Agent, or Firm*—Watson, Cole, Grindle & Watson

[57] ABSTRACT

A device and method are provided for restricting the cross sectional area of bark and new wood at a selected level in a growing stem by confining growth to a slot or slots delineated by edges of hard material functioning as a template so as to produce an insufficiency of media, or bottleneck, for translocation of metabolites, thereby to induce dwarfing and enhance formation of flowers, fruit, and seeds, similar in some respects to the effects of girdling.

29 Claims, 21 Drawing Figures

STEM GROWTH CONTROL DEVICE AND METHOD

This is a continuation of Ser. No. 745,324, filed Nov. 26, 1976 as a continuation of Ser. No. 610,771, filed Sept. 5, 1975 as a continuation-in-part of Ser. No. 429,392, filed Dec. 28, 1973, and now all abandoned.

This invention relates generally to the translocation of metabolites in a growing stem and more particularly to a method and device for bringing about the effects of girdling by mechanical means.

Girdling is variously defined. The term refers generally to encircling a stem partially or completely by a cut, commonly through the bark, at times into the wood, to interrupt pathways for translocation of metabolites. Girdling techniques have been used for centuries. To induce earlier fruiting in a tree slow to produce, a grower may girdle the tree by removing a band of bark one fourth inch wide from the entire circumference of the trunk. This is called ringing. A stem may be girdled completely around by one knife or saw cut through the bark to enhance the size and number of fruit. This is called scoring. Notching is a technique whereby bark in only a small portion of the circumference is interrupted, as above a bud, to induce growth by blocking suppressive hormones from the distal growing tip. These injuries heal generally in the course of one or two seasons. In clearing a forest, a woodsman may kill a tree by cutting deeply into the wood around the trunk.

The above techniques have in common the immediate development of insufficiency of media for translocation of metabolites by interruption of these pathways, generally in the phloem, sometimes in the wood. The method described herein provides a slot for growth which is only a part or fraction of the whole cross-sectional area about a growing stem into which the stem may grow, with provision for exclusion of growth from the remainder of this cross sectional area. It forces metabolites in translocation to traverse a narrow pass. It produces a state of insufficiency of media for such translocation at the pass.

The device is basically two generally straight linear segments of the periphery of a plate of hard strong material which are convergent as sides, or edges, of an angle, or angular projection, of the general periphery, at or near which angle the plate is affixed to a growing stem, in a plane transverse thereto, thereby dividing the plane into two areas, one including the plate and one empty except for the stem. The angle edges block growth, confining growth to the empty area referred to herein as a 'slot'. As generally used, there are more than one plate fixed to a stem, with a corresponding number of slots.

Carbon dioxide and water are combined by photosynthesis in the green leaves of a plant to form carbohydrates, the building material of roots, stems, flowers, leaves, fruits, and seeds. Carbohydrate moves from the leaves, through the bark generally downward toward the roots. Water and minerals absorbed by the roots move generally upward through the wood, deep to the bark, toward the leafy extremities, with the more superficial layers of wood carrying a disproportionately larger amount of the water and minerals than the deeper layers.

In a stem of a growing plant, new wood is formed deep to the cambium, superficial to other wood already similarly formed, the cabium with overlying bark being thrust thereby outwardly, or centrifugally. New bark is formed superficial to the cambium. The radius and circumference of the stem increase concomitantly, so that the growth may be resolved into two components, radial and circumferential. A strong band closely encircling a growing stem will oppose these components, and the bark, while being compressed against the inner surface of such a band by the underlying growth, will be progressively compressed and strangulation will ensue. It is the principal object of this invention, while avoiding such strangulation by allowing for relatively free radial growth, in a centrifugal direction, to restrict electively the circumferential component of growth by the fixation transversely of at least one plate of hard and strong material at the surface of a growing stem to serve as a pattern or template for weed and bark growth, thereby decreasing the eventual cross-sectional area of bark and new wood at the level of fixation, effecting a bottleneck to translocation of metabolites, comparable in some respects to the effects of girdling. Specifically, this invention is employed primarily on fruit trees to enhance flowering and fruiting, to increase fruit size, and to induce precocity or early fruit bearing. It is designed to induce dwarfing.

A further object of the invention is to provide such a device and technique wherein a truncated triangular plate is fixed to a stem, providing a quicker decrease in bark and new wood than is achieved by fixation at a simple corner.

A further object of the invention is to provide a slot for growth that diverges in a centrifugal direction, to allow for the greater demands of an enlarging peripheral plant.

A still further object is to provide such a control device and technique wherein an opening in a plate encircles a growing stem, the plate having at least one growth slot continuous with and extending outward from the opening, with the objective of restricting growth to the slot area, once the growth of the stem fills the opening.

Another object of the invention is to show a simple method for production of a plate with truncated corner and flange for fixation to a growing stem.

Still another object is to provide a fixing notch in the edge of a plate so that bark and ultimately new wood will fill the notch to form an auxiliary means of attachment to the stem, to aid and even supplant the primary screw means of fixation, should it weaken or fail.

It should be noted in each description herein that the peripheral shape of a plate except at a slot side generally is not of prime importance. The effect of a plate occurs at the slot sides during growth, and is produced by the hard resistant edges of plate material, which define the slots, turning back in a sense, or blocking, growth. In the most frequently described triangular plates, the two edges converging toward the point of fixation are basic to the modus operandi, whereas the existence of the third side as it occurs is simply the result of using the most convenient means for getting rid of (or conserving) material not necessary for function of the respective plate, once the working edges have been provided. A cut along the shortest course between two points provides a straight edge which, under the considered circumstances, imposes a triangular shape on the plate, the triangular aspect being an accident of convenience.

It should be further noted that the duration of the effect of the device on a specific tree is a function of the length of the aforedescribed edges which are convergent to form the slot sides, between which growth is confined. The effect of the device lasts until growth reaches the slot limits. Length of slot is elective.

Other objects, advantages, and novel features of the invention will become more apparent from the following detailed description when taken in conjunction with the accompanying drawings wherein:

FIGS. IA, IB, and IC are views showing stem growth stages with the use of one triangular plate, according to the invention.

FIGS. 7A through 7C show stages in preparation of a truncated plate with mounting flange, while 7D and 7E show three of the plates so prepared mounted on a stem.

Figure 1A:
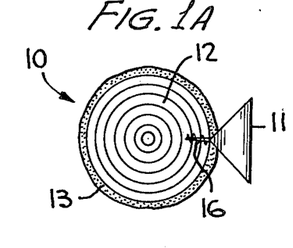
Figure 1B:
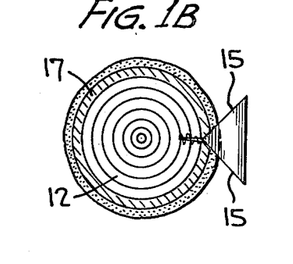
Figure 1C:
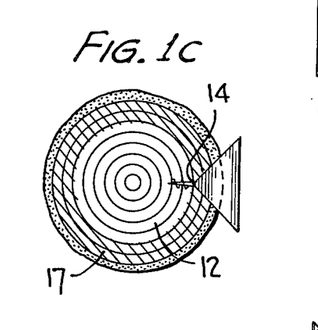

Turning now to the drawings wherein like reference characters refer to like and corresponding parts throughout the several views and wherein any and all plates may be constructed of strong weather-resistent material such as 14-gauge zinc galvanized steel plate, FIG. 1A is a cross-sectional view of a stem 10 wherein a flat rigid plate 11 is affixed to the wood portion 12 thereof through the bark 13. Plate 11 is triangular in shape with corner 14 pointed toward the stem axis. Plate 11 is secured in place by means of a threaded screw fastener 16, the plate being screwed into the wood portion 12 until corner 14 contacts portion 12 and is made to lie in a plane substantially transverse to stem 10 as shown in FIG. 1A. With plant growth, the cambium and bark are thrust radially outwardly by the wood deposited deep to them. Growth at any point adjacent to edges 15 of the plate takes place relatively uninhibited in a direction parallel to the adjacent edge. On the other hand, growth at any point adjacent to an edge 15 in a direction perpendicular to the adjacent edge is blocked by the edge itself, so that plant growth may occur in the plane of the plate everywhere except for that portion occupied by the plate itself. FIGS. 1B and 1C show successive stages of growth, with the dotted line within the triangle in each Figure representing the locus of bark that would be present under ordinary circumstances, but whose growth into the area has been blocked by the plate. New wood, formed after fixation of the plate, is as seen in both Figures at 17. Since growth into the space occupied by the plate is prevented, the translocation of metabolites through such space after further tree growth is likewise prevented. This growth pattern has been demonstrated repeatedly by experimental work. It is to be noted that edges 15 are the functional parts of plate 11, and that the status of being triangular in shape is simply the result of removal of excess material once the desired lengths for the edges 15 are obtained. Plate 11 could be rectangular or octagonal and function in a similar fashion, as long as edges 15 are preserved.

Figure 2A:
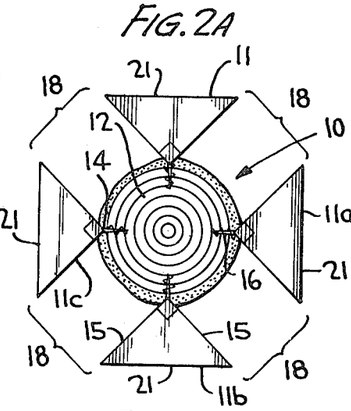
FIGS. 2A, 2B and 2C are views of another embodiment of the invention comprising four right angular plates and showing corresponding growth of bark and new wood, the slots for growth between plate edges being delineated.
Figure 2B:
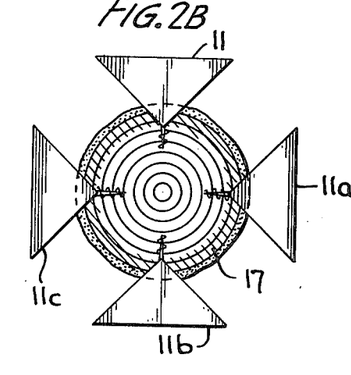
Figure 2C:
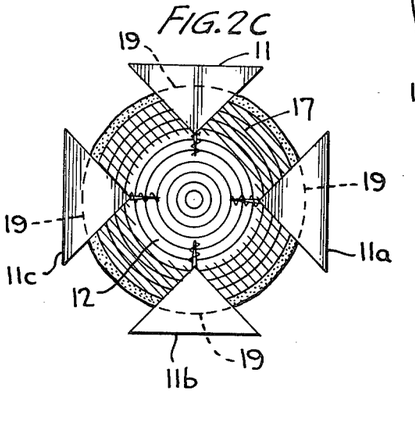

In FIG. 2A, four plates similar to plate 11 in FIG. 1A are shown in their relation to a growing stem 10, as in FIG. 1. These plates, 11 through 11C, are equally spaced in a common plane about 10, so that four equally spaced slots 18 are formed between adjacent parallel side edges of the plates. FIGS. 2B and 2C illustrate later stages after plant growth has occurred, new wood 17 being shown in each Figure. As seen in both FIGS. 2B and 2C, bark 13 exists at the level of the plates only in the four slots 18, the bark extending within each slot in an arc between adjacent side edges 15 of the plates. In spite of growth of the stem, there is no substantial increase in the arcuate length of bark in each slot. The total arcuate length of bark remains approximately four times the width of a slot 18. The locus of bark which would be present without the use of the plates is shown by dotted lines 19. Growth of new wood 17 is controlled in the same manner as bark growth. Accordingly, bark and new wood, the principal pathways in translocation of metabolities, exist only in the slots between edges 15 of the plates. With continued apical growth distal to the plates in the presence of a constant area of bark at plate level, an insufficiency of bark and new wood, the media for translocation, is approached.

Figure 3A:
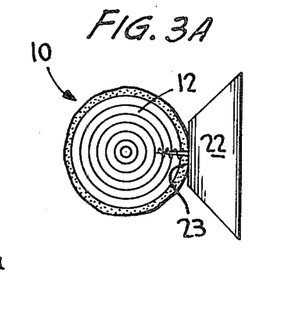
FIGS. 3A, 3B, and 3C are views of still another embodiment of the invention comprising a triangle with one corner truncated, the latter two views showing the more rapid effects of truncation.
Figure 3B:
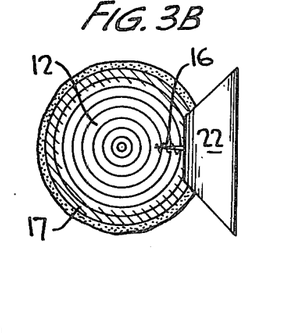
Figure 3C:
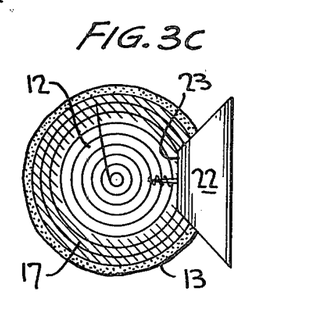

In the FIG. 3 embodiment, plate 22, in lieu of plate 11, is in the form of a triangle which is truncated to form a leading edge 23. Fastering means 16 is located centrally on this truncated edge 23 and projects outwardly therefrom. Plate 22 is affixed to the stem 10 in a plane transverse thereto, as in FIGS. 1 and 2. Edge 23 is tangent to bark 13 so that a small amount of growth as in FIG. 3B will thrust the bark against edge 23, resulting in an actual decrease in functional circumferential bark at the level of the plate by compression of the bark located between the truncated edge 23 and the axis of stem 10. FIG. 3C illustrates a further stage of plant growth, with bark and new wood blocked from the area of the plate, circumferential growth having been limited by the plate edges.

Figure 4A:
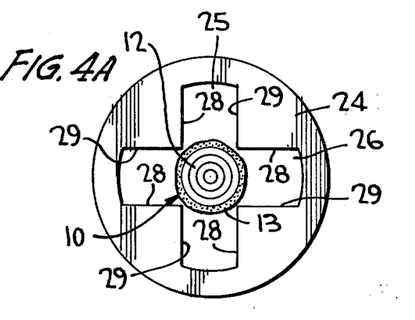
FIGS. 4A, 4B, 4C, and 4D show yet another embodiment of this invention comprising a disc-shaped plate with a central opening and four slots for growth with parallel sides at ninety degree intervals.
Figure 4B:
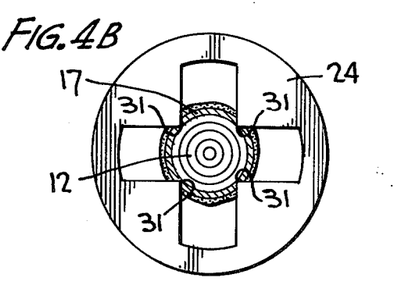
Figure 4C:
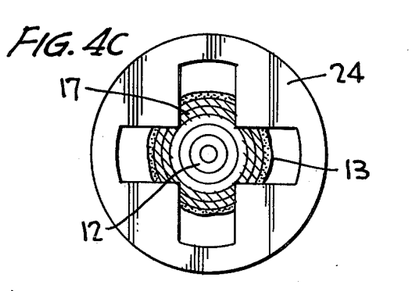
Figure 4D:
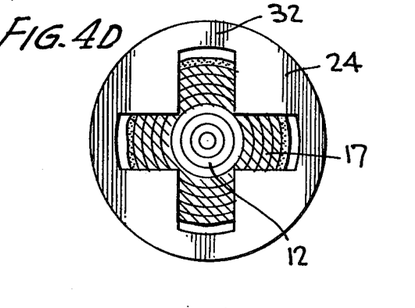

Another form of the invention is shown in FIG. 4A which is generally a disc-shaped plate 24 having two perpendicular intersecting slots 25 and 26 of equal width and parallel sides 28 and 29 forming a cruciate opening. This plate encircles stem 10 and lies in a plane transverse thereto as shown in FIG. 4A, and does not interfere with plant growth until the stem, as growth occurs, becomes large enough in diameter for its bark 13 to impinge upon the apices 31 respectively formed at the intersection of side edges 28 and 29 as shown in FIG. 4B. Thereafter, as shown in FIGS. 4C and 4D, the radially outward growth of the bark away from the stem axis and parallel to adjacent edges 28 or 29 of the slots is restricted so that the total arcuate length of the bark at the level of plate 24 remains basically unchanged. Similarly, as described with reference to FIG.

2B and 2C, the same growth limitations exist for the formation of new layers of weed as the circumferential cambium is moved progressively in a centrifugal direction in the slots during plant growth, with formation of new weed deep to the cambium occurring within the slots themselves. As bark 13 approaches the farthest limits of the slots, as in FIG. 4D, the continuous rim 32 may be removed to prevent plant stangulation.

It can be seen that plate 24 is similar in design and function to plates 11 to 11C of FIG. 2 except that plate 24 has its equivalent triangular sections interconnected at their base portions by means of an integral ring 32. Accordingly, circumferential growth of bark and new wood adjacent edges 28 and 29 is limited in a direction perpendicular thereto, while corresponding radial or centrifugal growth occurs relatively freely. With such an arrangement, it is assumed that with subsequent growth the translocation of metabolites through the plane of plate 24 occurs increasingly through slots 25 and 26, while no translocation can occur through that portion occupied by plate 24 itself.

Figure 5:
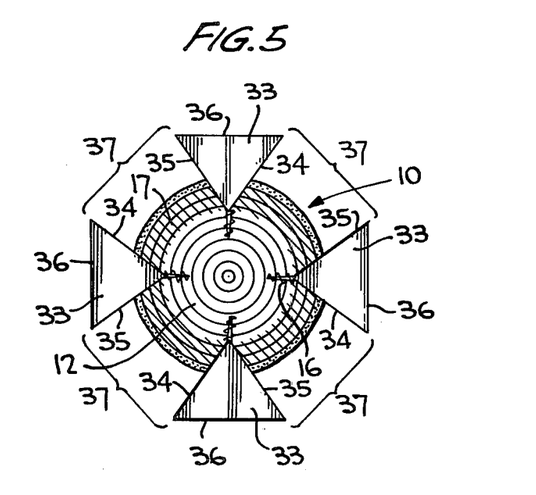
FIG. 5 is a view similar to FIG. 2C of still another embodiment of the invention comprising multiple plates and divergent slot sides in a centrifugal direction.

FIG. 5 shows a divergence in a centrifugal direction of slot sides, defined by plate edges 34 and 35, intersecting in each plate at an angle less than 90 degrees. Since there are four plates 33 in this particular form of the invention, the sum of their angles of fixation is less that 360 degrees. By simple geometry, slot divergence in a centrifugal direction is apparent. In this form, each increment of growth encounters a wider lateral limit than the preceding increment, resulting in a controlled increase in the media for translocation of metabolites to provide for an enlargening tree, so as more nearly to maintain desired state of insufficiency.

Figure 6:
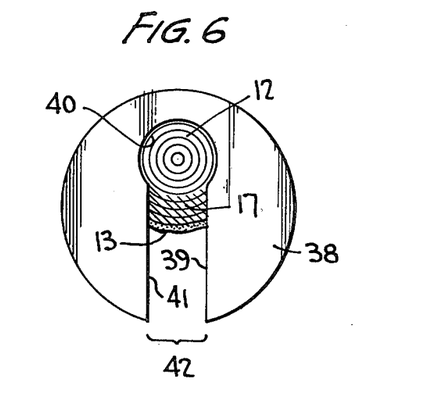
FIG. 6 is a view of yet another embodiment in accordance with the invention comprising a disc-shaped plate with eccentric opening and one slot, mounted on a horizontal limb. It is to be noted that in this shape the device 'hangs' from the contained stem, its center of gravity lying in a state of equilibrium below the axis of the stem.

FIG. 6 shows a disc-shaped plate 38 with an eccentric opening 40 and side edges 39 and 41 extending therefrom, mounted on a horizontal stem 12. The eccentric position of opening 40 places the center of gravity in slot 42, below the supporting limb, so that plate 38 will not fall once in the position shown. Such a plate may be quickly placed over a growing stem without additional fixation. Growth, after filling opening 40, will be confined to slot 42. It is to be noted that edges 39 and 41 are the prime functional elements of plate 38, and that the disc shape is merely a convenience. The structure could be rectangular or octagonal and function as well. The same considerations pertain to disc-shaped plate 24.

Figures 7A, 7B, 7C, 7D, 7E:
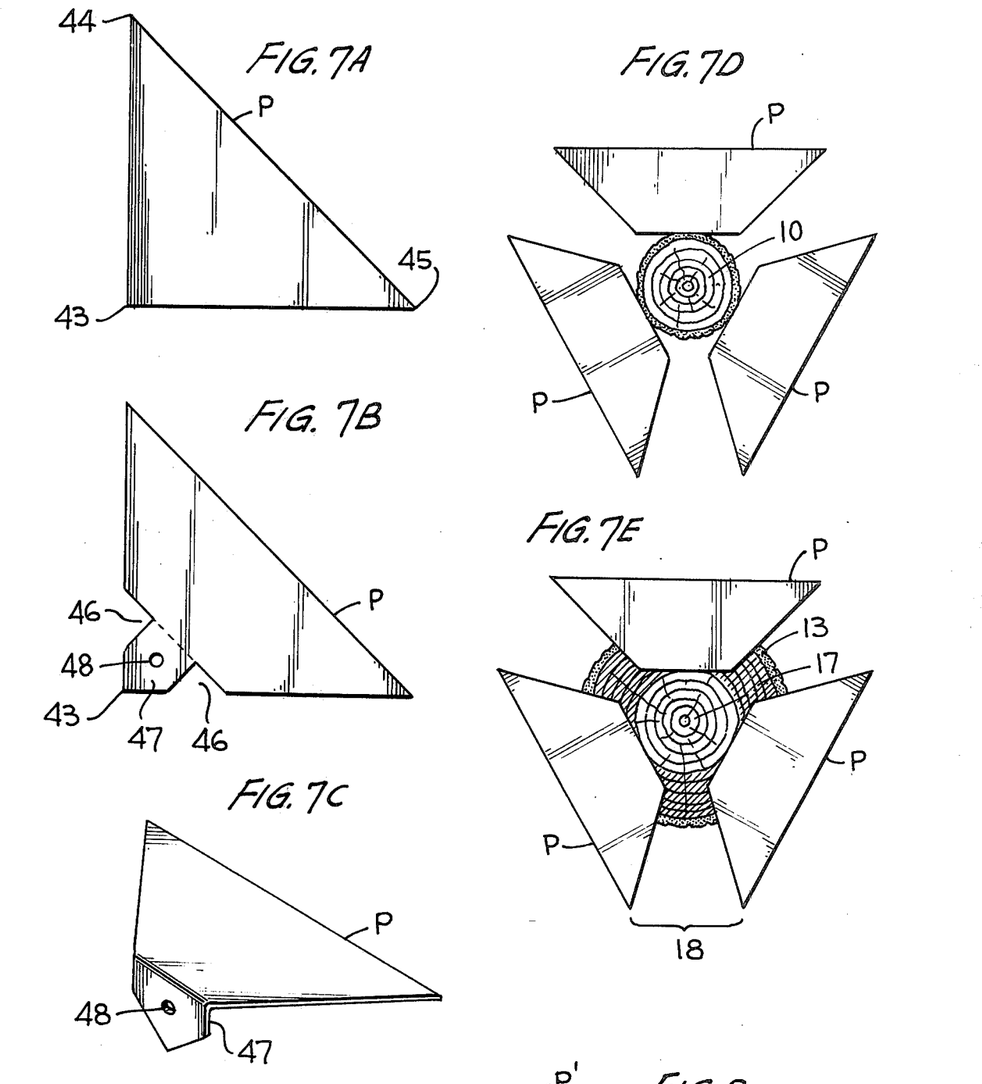

FIG. 7A depicts a triangular plate P with corners 43, 44, and 45. FIG. 7B shows the plate with knotches 46 separated by a tongue 47, formed by removal of the material originally present in the sites of knotches 46, containing corner 43 and perforation 48, for a fixing screw. In FIG. 7C, tongue 47 has been bent approximately 90 degrees out of the general plane of the plate, for fixation to a stem by a screw, mounted through the perforation 48.

FIG. 7D shows 3 such plates P evenly separated and fixed in a common plane transverse to a stem 10 before growth has occurred. FIG. 7E shows the same arrangement after significant growth, depicting the decreased circumferential bark 13 and new wood 17 as compared to that present at the time of fixation to the stem 10, plus the centrifugally widening slots 18 allowing for a controlled increase in bark and new wood with subsequent growth.

Figure 8:
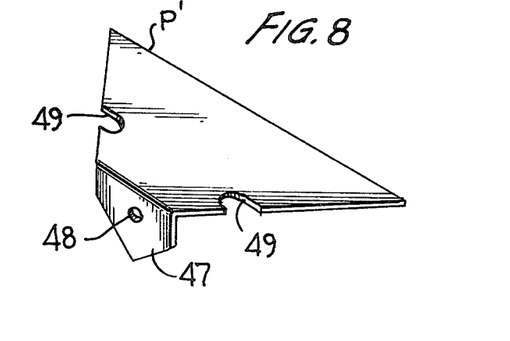
FIG. 8 shows a plate, similar to FIG. 7C, with a notch in each of its two edges which form slot sides, each notch to function as a means for fixation off the plate once growth has filled it with wood.

FIG. 8 depicts a truncated triangular plate p' with a semicircular notch 49 in each edge leading to the truncation. After fixation, as shown in FIGS. 7D and 7E and with further growth, wood will fill each knotch 49, transfixing the plate and rendering it less dependent on or even independent of the primary fixing screw through perforation 48.

In February, 1974, before the onset of spring growth, plates of the type shown in FIGS. 7A-7E were mounted on ten trees in a peach orchard. The trees were three years old, and are located in Talbot County, Georgia. Plated trees were in three rows, designated C, D, and E. The plates were mounted three or four to a tree, and were evenly spaced at the time of mounting, being placed on the trunk below the lowest limb in each case. The trees in each row were numbered, so that corresponding numbers were opposite. Plated trees were separated by control trees, of which there were twelve.

On May 17, 1975, with one full season of growth and approximately two and one half months of growth into a new season, all plated trees showed growth well out into the slots between plates, and all were greater in circumference above the plates below. At this time, length of the season's new growth on each plated tree and each control tree was measured.

On June 23 and 24, 1975, the trees were picked, and the weight and number of peaches form each tree recorded. These data are shown in Table I below, which also shows an average weight of the peaches for each tree.

Table I

| Tree | Number of Plates | Percent Girdled | Circumference below plates (inches) | Circumference above plates (inches) | length new growth (inches) | Weight of fruit (lb) | Number of peaches | Average peach wgt. (lbs) |
| --- | --- | --- | --- | --- | --- | --- | --- | --- |
| C1 | 0 | 0 | | | 18 | 24.4 | 93 | 0.25 |
| C2 | 3 | 66⅔ | 11 | 15 | 18 | 38.9 | 132 | 0.29 |
| C3 | 0 | 0 | | | 18 | 44.9 | 118 | 0.38 |
| C4 | 3 | 66⅔ | 10¼ | 13¼ | 16 | 25.3 | 72 | 0.35 |
| C5 | 0 | 0 | | | 19 | 17.3 | 54 | 0.32 |
| C6 | 4 | 80 | 9¼ | 13 | 12 | 66.2 | 165 | 0.40 |
| C7 | 0 | 0 | | | 21 | 6.8 | 25 | 0.27 |
| C8 | 0 | 0 | | | 22 | 1 | 5 | 0.20 |
| C9 | 4 | 80 | 10¼ | 14½ | 8 | 51.6 | 128 | 0.40 |
| D2 | 0 | 0 | | | 21 | 6.3 | 29 | 0.22 |
| D3 | 3 | 60-66⅔ | 8½ | 12¼ | 7½ | 56.1 | 392 | 0.14 |
| D4 | 0 | 0 | | | 18 | 16.3 | 41 | 0.40 |
| D5 | 4 | 75-80 | 10⅜ | 12¼ | 13 | 46.8 | 131 | 0.36 |
| D6 | 0 | 0 | | | 21 | 1 | 6 | 0.167 |
| D7 | 4 | 80 | 9½ | 11¾ | 4 | 37.3 | 395 | 0.094 |
| D8 | 0 | 0 | | | 19 | 12.3 | 34 | 0.36 |
| D10 | 4 | 75 | 10 | 14θ | 9½ | 81.1 | 465 | 0.17 |
| E3 | 0 | 0 | | | 18 | 6.8 | 28 | 0.24 |

Table I-continued

| Tree | Number of Plates | Percent Girdled | Circumference below plates (inches) | Circumference above plates (inches) | length new growth (inches) | Weight of fruit (lb) | Number of peaches | Average peach wgt. (lbs) |
|---|---|---|---|---|---|---|---|---|
| E4 | 3 | 60-66⅔ | 10¼ | 13¼ | 15 | 19.3 | 48 | 0.402 |
| E5 | 0 | 0 | | | 16½ | 31.8 | 74 | 0.43 |
| E6 | 3 | 60 | 8½ | 11 | 18 | 24.3 | 82 | 0.30 |
| E7 | 0 | 0 | | | 20 | 15.8 | 49 | 0.32 |

Table II below gives average values for length of new growth, crop weight, peaches per tree, and individual peach weight for control trees, trees with three plates, and trees with four plates.

| | Number of Trees | Average New Growth | Average Crop Weight | Average Peach Count | Average Peach Weight |
|---|---|---|---|---|---|
| Control trees without plates | 12 | 19.3 | 15.4 | 46.3 | 0.332 |
| trees with three plates | 5 | 14.9 | 32.8 | 145.6 | 0.225 |
| trees with four plates | 5 | 9.3 | 56.6 | 250.8 | 0.226 |

It is apparent that plating as carried out in the above described procedure was followed by a statistically significant increase in weight of crop and number of individual fruit, each fruit having been preceded by a flower and containing a seed. Decreased length of growth, or dwarfing, occurred regularly.

Not covered by the data contained in Tables I and II are four 'irregular' trees. Three of these (A6, F7, G10) were 'forked', each into two equal stems, in February, 1974, when three truncated plates were placed on one fork of each of the trees. The data for each fork of two of the trees (F7, G10) were obtained as with the plated trees. One forked tree (A6) was accidentally picked with out counting and weighing. The fourth 'irregular' tree (c10) had one truncated triangular plate mounted immediately below a major limb. Fruit from this limb and from the remainder of the tree were weighed and counted separately, with the values along with those from the forked trees, presented in Table III below.

| | Number of Plates | Weight of fruit (pounds) | Number of Peaches | Average Peach Weight (pounds) |
|---|---|---|---|---|
| C10 Limb above plate | 1 | 12.1 | 27 | 0.45 |
| Remainder of C10 | 0 | 15.3 | 53 | 0.29 |
| F7 South Fork | 3 | 14.3 | 34 | 0.42 |
| F7 North Fork | 0 | 13.3 | 36 | 0.37 |
| G10 South Fork | 3 | 10.3 | 28 | 0.37 |
| G10 North Fork | 0 | 4.3 | 18 | 0.24 |

It is to be noted that the average weight of peaches obtained above plates in each of the 'irregular' trees exceeds the average weight of peaches from other areas of the respective tree, and in two of the three trees the excess is a considerable fifty percent. Also, the average weight of peaches from each 'irregular' tree above the plates exceeded the average weight for peaches from unplated control trees.

It is further to be noted that the average weight of 0.332 lbs. for peaches from unplated control trees is exceeded by the corresponding value for five of the ten plated trees, in spite of the greater number of peaches present on the plated trees.

In any of the various embodiments of the invention, the thickness of the plates in the direction of the axis of the stem may be varied as by placing two plates together, or by making the plate thicker, without departing from the spirit of the present invention.

From the aforesaid it can be seen that the control device functions as a template for growth of bark and new wood, prepositioned in the immediately adjacent but yet unoccupied space about a growing stem, space that under ordinary growth circumstances would be ultimately occupied by bark and new wood. By its presence the device allows growth only in that portion of this space which it does not occupy. Thus, in contradistinction to established girdling techniques which interrupt channels for translocation immediately, it defines the shapes, sizes, and locations of channels for translocation in the plane of the device later as growth extends centrifugally, after fixation. The effects of the method as shown by the data included herein are dwarfing, enhancement of flowering, and enhancement of fruiting.

Obviously, many other modifications and variations of the present invention are made possible in the light of the above teachings. It is, therefore, to be understood that, within the scope of the appended claims, the invention may be practiced otherwise than as specifically described.

What is claimed is:

1. A method for limiting growth of a plant at a selected level for control of translocation past said level, comprising the step of confining growth to at least one slot at said level, said slot extending outwardly from said plant and being transverse to channels for translocation of metabolites at said level and being delineated laterally on each of its respective sides by an edge of a plate of material maintained transverse to said channels and strong and rigid enough to resist the pressure of growth while functioning adequately as a template or pattern for limitation of growth, each said edge serving to limit growth at and perpendicular to the respective said edge while allowing relatively free growth at and parallel to the respective said edge, so that, in and immediately adjacent to a surface transverse to said pathways and surrounding said plant at the time of initiation of said method and defined by and lying within said slot and said material, growth occurs in said slot and not in the portion of said surface occupied by said material, with, after such growth, an ultimate area occupied by said plant in said surface smaller because of and in proportion to the degree of said limitation, there being produced thereby a narrow pass, or bottleneck, or insufficiency of means for translocation past said level.

2. A method for achieving an earlier or accelerated rate of limitation of growth of a plant at a selected level for control of translocation, comprising, providing a generally wedge-shaped apically truncated plate fixed to and with its truncated apical portion adjacent to said plant transverse to the pathways for said translocation at said level, so that with growth progressive contact between said plant and said device will occur at a more rapid rate than would occur were said portion not truncated.

3. A method for avoiding penetration and transection of pathways for translocation of metabolites in a plant at a first level of a wedge-shaped plate-like device while fixing and maintaining said device in constant spatial relationship and transverse to said pathways, comprising providing an extension rigidly continuous with and projecting away from the general plane of the device, and fixing said extension to the plant at a second level spaced from said first level, penetration of said plant at said first level being thereby avoided.

4. A method for achieving, after initial fixation, additional means of fixation for maintenance of a constant spatial relationship between a plant and a generally wedge-shaped plate-like device fixed transverse to pathways for translocation for control of translocation in the plant, comprising providing one such device with at least one irregularity in its otherwise generally uniform wedge shape such that, after initial fixation of the device to the plant, the irregularity will be overgrown by and entrapped within the new tissue of the plant, displacement of the device with respect to the plant being thereby resisted.

5. A method for restricting growth of a plant at a selected level to at least three and at most four generally similar slots, evenly spaced in a surface at said level surrounding said plant and transverse to pathways for translocation at said level, for control of translocation, comprising fixing in said surface with apical portions adjacent to said plant at least three and at most four generally similar wedge-shaped plates separated by said slots, with, after initiation of said method, extension of growth into said slots and not into the areas at said level occupied by said plates.

6. A device for restricting growth of a plant at a selected level for control of translocation which combines in use the advantage of avoiding penetration of the plant at said level with the advantage of achieving a more rapid rate of restriction of growth than would occur with an untruncated otherwise similarly shaped and used wedge-shaped plate, comprising a generally wedge-shaped plate truncated by virtue of its apical portion, being bent approximately 90° from the general plane of the plate along a line generally perpendicular to the bisector of the angle of the apex, said bent portion having a bore through which fixing means may extend, so that after fixation of the apical portion of the plate through the bore tangent to a plant, with the apical portion of said bisector generally parallel to pathways for translocation, the truncated main body of the plate will lie at a level of the plant different from the level of the boring, and growth of the plant will produce contact between the plant and the plate at the line of truncation at a more rapid rate than would occur were said non-apical portion replaced by a similarly positioned and, except for truncation, similarly shaped plate.

7. A method for restricting growth of a plant at a selected level to at least three and at most four generally similar slots, evenly spaced in a surface at said level surrounding said plant and transverse to pathways for translocation at said level, for control of translocation, comprising fixing in said surface, with apical portions adjacent to said plant, at least three and at most four generally similar wedge-shaped plates separated by said slots, the sum of the apical angles of said plates in any application of said method being substantially greater than 180°, with, after initiation of said method, extension of growth into said slots and not into the areas of said surface occupied by said plates.

8. A method for restricting growth of a plant in a surface transverse to channels for translocation at a selected level, for control of translocation, by an apically truncated or blunted generally wedge-shaped plate, comprising providing at least one apically truncated or blunted wedge-shaped plate with a rigid projection extending away from the general plane of the plate, which combines the advantage of avoiding penetration of the plant at said level with the advantage of achieving a more rapid rate of restriction of growth than would occur with use of an untruncated or unblunted but otherwise similarly shaped and used plate, and fixing the projection to the plant at a second level different from said selected level so that the plate lies in said surface with the line of truncation or blunting adjacent to the plant, so that with subsequent growth contact between plant and plate will be more rapid than would occur were said provided plate replaced by a similarly positioned and, except for truncation or blunting, similarly shaped plate.

9. A device for control of translocation in a plant comprising a generally wedge-shaped plate, apically truncated or blunted, with sides generally convergent toward the apex at an angle not less than 60° and with penetrating means, such as a screw, extending from and rigidly fixed to the apical extremity of the plate along a projection of the bisector of the apical angle for penetration of the plant and fixation of the plate immediately adjacent thereto and transverse to pathways for translocation at the level of penetration.

10. A device for control of translocation in a plant comprising a generally wedge-shaped plate, with sides generally convergent toward the apex at an angle not less than 60° and with penetrating means, such as a screw, extending from and rigidly fixed to the apical extremity of the plate along a projection of the bisector of the apical angle for penetration of the plant and fixation of the plate immediately adjacent thereto and transverse to pathways for translocation at the level of penetration.

11. A method for fixing a generally wedge-shaped plate, adjacent to and in constant spatial relationship to a plant and transverse to pathways for translocation for control of translocation, comprising providing said plate with penetrating means rigidly continuous with and extending away from the apical extremity of said plate along a projection of the bisector of the apical angle, and penetrating said plant with said means in a direction generally perpendicular to the surface of the plant so that the margin of said plate adjacent to said means lies adjacent to the plant transverse to pathways for translocation, growth of the plant subsequently being excluded from the space occupied by the plate.

12. A method for control of translocation in a stem comprising, arranging and maintaining at the surface of said stem transverse to channels for trnslocation, for restriction of growth in at least a major portion of the sectors about the axis of said stem, at least one linear segment of material impervious to growth and resistant to the pressure of growth, so that a major portion of translocation through channels for translocation parallel to the axis of said stem and to the grain of wood and bark of said stem is impeded, but so that unrestricted growth is continuous with and extends without interruption between the portion of said stem above said restriction and the portion of said stem below said restriction in a pattern determined by the positioning of said linear segment, translocation in a direction parallel to the axis of said stem past the site of said restriction persisting at a reduced rate.

13. A method for control of translocation in a stem comprising, confining said stem within an incomplete enclosure for restriction of growth, said enclosure being incomplete by virtue of there being at least one gap or break in its limits, said enclosure being limited by at least one linear segment of material impervious to growth and resistant to the pressure of growth and maintained about said stem in a position transverse to channels for translocation, so that growth is restricted in a major portion of the sectors about the axis of said stem but growing tissue at all times is continuous with and extends without interruption between the portion of said stem above and the portion of said stem below the site of said restriction in a pattern determined by the positioning of said linear segment, so that growth of said stem will be restricted at the limits of said incomplete enclosure by said linear segment and will extend through said gap.

14. A method for control of translocation in a stem comprising, confining said stem within an incomplete enclosure continuous through at least one gap with a slot for restriction of growth, said enclosure being incomplete by virtue of said gap, said gap being a break or hiatus in the limits of said incomplete enclosure, said incomplete enclosure being limited by at least one linear segment of material impervious to growth and resistant to the pressure of growth and maintained closely about said stem in a position transverse to channels for translocation, said slot extending away from said stem and being limited on each of its two sides by a linear segment of material impervious to growth and resistant to the pressure of growth, so that growth is restricted in a major portion of the sectors about the axis of said stem, but growing tissue at all times is continuous with and extends without interruption between the portion of said stem above and the portion of said stem below the site of said restriction in a pattern determined by the positioning of said linear segment, so that growth of said stem will be restricted at the limits of said incomplete enclosure and will extend through said gap and be restricted at the limits of said slot.

15. A method for control of translocation in a stem by restriction of growth comprising, maintaining closely at the surface of said stem transverse to channels for translocation a linear segment of material impervious to growth and resistant to pressure of growth, said linear segment subtending not more than 180° about the axis of said stem, so that growth will be restricted by said linear segment and translocation impeded thereby and thereat.

16. A method for control of translocation in a stem by restriction of growth comprising, containing said stem closely within an incomplete enclosure, the limits of said incomplete enclosure being incomplete by virtue of there being a plurality of gaps or breaks in the continuity of the limits thereof, the number of said gaps corresponding to the number of said linear segments, so that growth of said plant will be restricted by said linear segments and will extend through said gaps.

17. A method for control of translocation in a stem by restriction of growth comprising, confining said stem closely within an incomplete enclosure, the limits of said incomplete enclosure having a plurality of gaps through each of which said gaps said enclosure is continuous with a slot for restriction of growth, the limits of said slot on each of its two sides being a linear segment of material impervious to growth and resistant to the pressure of growth, so that growth of said stem will be restricted at the limits of said enclosure and will extend through at least one gap into the said slot related thereto and will be restricted thereafter at each side of said slot by said respective linear segment.

18. A method for enhancement of fruit production by a stem comprising arranging and maintaining at the surface of said stem transverse to channels for translocation, for restriction of growth in at least a major portion of the sectors about the axis of said stem, at least one linear segment of material impervious to growth and resistant to the pressure of growth, so that a major portion of translocation through channels for translocation parallel to the axis of said stem and to the grain of wood and bar of said stem is impeded, but so that unrestricted growth is continuous with and extends without interruption between the portion of said stem above said restriction and the portion of said stem below said restriction in a pattern determined by the positioning of said linear segment, translocation in a direction parallel to the axis of said stem past the side of said restriction persisting at a reduced rate, production of fruit by said stem being thereby enhanced.

19. A method for enhancement of fruit production by a stem comprising confining said stem within an incomplete enclosure for restriction of growth, said enclosure being incomplete by virtue of there being at least one gap or break in its limits, said enclosure being limited by at least one linear segment of material impervious to growth and resistant to the pressure and maintained about said stem in a position transverse to channels for translocation, so that growth is restricted in a major portion of the sectors about the axis of said stem but growing tissue at all times is continuous with and extends without interruption between the portion of said stem above and the portion of said stem below the site of said restriction in a pattern determined by the positioning of said linear segment, so that growth of said stem will be restricted at the limits of said incomplete enclosure by said linear segment and will extend through said gap, production of fruit by said stem being thereby enhanced.

20. A method for enhancement of fruit production by a stem comprising confining said stem within an incomplete enclosure continuous through at least one gap with a slot for restriction of growth, said enclosure being incomplete by virtue of said gap, said gap being a break or hiatus in the limits of said incomplete enclosure, said incomplete enclosure being limited by at least one linear segment of material impervious to growth and resistant to the pressure of growth and maintained closely about said stem in a position transverse to channels for translocation, said slot extending away from said stem and being limited on each of its two sides by a linear segment of material impervious to growth and resistant to the pressure of growth, so that growth is restricted in a major portion of the sectors about the axis of said stem, but growing tissue at all times is continuous with and extends without interruption between the portion of said stem above and the portion of said stem below the site of said restriction in a pattern determined by the positioning of said linear segment, so that growth of said stem will be restricted at the limits of said incomplete enclosure and will extend through said gap and be restricted at the limits of said slot, production of fruit by said stem being thereby enhanced.

21. A method for effecting a restricted passage for translocation of water in a stem comprising arranging and maintaining at the surface of said stem transverse to channels for translocation and the grain of bark and wood, at least one linear segment of material impervious to growth and resistant to the pressure of growth for restriction of growth, so that growth in at least a major portion of the sectors about the axis of said stem is restricted, but so that growth of new wood is continuous with and extends without interruption between that portion of said stem above and that portion of said stem below said restriction in a pattern determined by the position of said linear segment, so that translocation of water past the site of said restriction occurs increasingly in said new wood, both because with growth said new wood increasingly represents a larger percentage or fraction of wood for translocation past said site and because deeper layers of wood nearer said axis progressively loye capacity for translocation of water.

22. A method for effecting a restricted passage for translocation of water in a stem comprising containing said stem within an incomplete enclosure for restriction of growth, said enclosure being limited by at least one linear segment of material impervious to growth and resistant to the pressure of growth and maintained close about said stem in a position transverse to channels for translocation, so that growth, on reaching the limits of said enclosure, is restricted thereat, and new wood continues to be formed at said gap and extends therethrough as the only new wood being formed, so that translocation of water past the site of said incomplete enclosure occurs increasingly in said new wood, both because said new wood increasingly represents a larger percentage or fraction of wood for translocation of water past said site and because wood in deeper layers nearer said axis progressively lose capacity for translocation of water.

23. A method for effecting a restricted passage for translocation of water comprising containing said stem with an incomplete enclosure continuous through at least one gap with a slot for restriction of growth, said enclosure being incomplete by virtue of the existence of said gap, said slot extending away from said gap and said stem and being limited on each of its two sides by a linear segment of material impervious to growth and resistant to the pressure of growth, so that growth, on reaching the limits of said enclosure, is restricted thereat, and new wood continues to be formed at said gap and extends therethrough into said slot as the only new wood being formed, to be restricted thereafter at the limits of said slot, so that translocation of water past the site of said slot occurs increasingly in said slot, both because said new wood in said slot increasingly represents a larger percentage or fraction of wood for trnslocation of water past the said site of said slot and because wood in deeper layers nearer the axis of said stem progressively lose capacity for trnslocation of water.

24. A method for induction of precocity in a stem comprising arranging and maintaining at the surface of said stem transverse to channels for translocation, for restriction of growth in at least a major portion of the sectors about the axis of said stem, at least one linear segment of material impervious to growth and resistant to the pressure of growth, so that a major portion of translocation through channels for translocation parallel to the axis of said stem and to the grain of wood and bark of said stem is impeded, but so that unrestricted growth is continuous with and extends without interruption between the portion of said stem above said restriction and the portion of said stem below said restriction in a pattern determined by the positioning of said linear segment, translocation in a direction parallel to the axis of said stem past the site of said restriction persisting at a reduced rate.

25. A method for induction of precocity in a stem comprising confining said stem within an incomplete enclosure for restriction of growth, said enclosure being incomplete by virtue of there being at least one gap or break in its limits, said enclosure being limited by at least one linear segment of material impervious to growth and resistant to the pressure of growth and maintained about said stem in a position transverse to channels for translocation, so that growth is restricted in a major portion of the sectors about the axis of said stem but growing tissue at all times is continuous with and extends without interruption between the portion of said stem above and the portion of said stem below the site of said restriction in a pattern determined by the position of said linear segment, so that growth of said stem will be restricted at the limits of said incomplete enclosure by said linear segment and will extend through said gap.

26. A method for induction of precocity in a stem comprising confining said stem within an incomplete enclosure continuous through at least one gap with a slot for restriction of growth, said enclosure being incomplete by virtue of said gap, said gap being a break or hiatus in the limits of said incomplete enclosure, said incomplete enclosure being limited by at least one linear segment of material impervious to growth and resistant to the pressure of growth and maintained closely about said stem in a position transverse to channels for translocation, said slot extending away from said stem and being limited on each of its two sides by a linear segment of material impervious to growth and resistant to the pressure of growth, so that growth is restricted in a major portion of the sectors about the axis of said stem, but growing tissue at all times is continuous with and extends without interruption between the portion of said stem above and the portion of said stem below the site of said restriction in a pattern determined by the positioning of said linear segment, so that growth of said stem will be restricted at the limits of said incomplete enclosure and will extend through said gap and be restricted at the limits of said slot.

27. A method for induction of early ripening of fruit on a stem comprising arranging and maintaining at the surface of said stem transverse to channels for translocation, for restriction of growth in at least a major portion of the sectors about the axis of said stem, at least one linear segment of material impervious to growth and resistant to the pressure of growth, so that a major portion of translocation through channels for translocation parallel to the axis of said stem and to the grain of wood and bark of said stem is impeded, but so that unrestricted growth in continuous with and extends without interruption between the portion of said stem above said restriction and the portion of said stem below said restriction in a pattern determined by the positioning of said linear segment, translocation in a direction parallel to the axis of said stem past the site of said restriction persisting at a reduced rate.

28. A method for induction of early ripening of fruit on a stem comprising confining said stem within an incomplete enclosure for restriction of growth, said enclosure being incomplete by virtue of there being at least one gap or break in its limits, said enclosure being limited by at least one linear segment of material impervious to growth and resistant to the pressure of growth and maintained about said stem in a position transverse to channels for translocation, so that growth is restricted in a major portion of the sectors about the axis of said stem but growing tissue at all times is continuous with and extends without interruption between the portion of said stem above and the portion of said stem below the site of said restriction in a pattern determined by the positioning of said linear segment, so that growth of said stem will be restricted at the limits of said incomplete enclosure by said linear segment and will extend through said gap.

29. A method for induction of early ripening of fruit on a stem comprising confining said stem within an incomplete enclosure continuous through at least one gap with a slot for restriction of growth, said enclosure being incomplete by virtue of said gap, said gap being a break or hiatus in the limits of said incomplete enclosure, said incomplete enclosure being limited by at least one linear segment of material impervious to growth and resistant to the pressure of growth and maintained closely about said stem in a position transverse to channels for translocation, said slot extending away from said stem and being limited on each of its two sides by a linear segment of material impervious to growth and resistant to the pressure of growth, so that growth is restricted in a major portion of the sectors about the axis of said stem, but growing tissue at all times is continuous with and extends without interruption beween the portion of said stem above and the portion of said stem below the site of said restriction in a pattern determined by the positioning of said linear segment, so that growth of said stem will be restricted at the limits of said incomplete enclosure and will extend through said gap and be restricted at the limits of said slot.

* * * * *